US010997164B2

(12) United States Patent
Geissinger et al.

(10) Patent No.: US 10,997,164 B2
(45) Date of Patent: May 4, 2021

(54) UNIFIED TABLE DELTA DICTIONARY LAZY MATERIALIZATION

(71) Applicant: SAP SE, Walldorf (DE)

(72) Inventors: Steffen Geissinger, Wiesloch (DE); Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 1119 days.

(21) Appl. No.: 14/949,699

(22) Filed: Nov. 23, 2015

(65) Prior Publication Data

US 2017/0147633 A1 May 25, 2017

(51) Int. Cl.
*G06F 16/00* (2019.01)
*G06F 16/23* (2019.01)
*G06F 16/27* (2019.01)
*G06F 16/28* (2019.01)

(52) U.S. Cl.
CPC .......... *G06F 16/2393* (2019.01); *G06F 16/27* (2019.01); *G06F 16/283* (2019.01); *G06F 16/284* (2019.01)

(58) Field of Classification Search
CPC .................................................. G06F 16/284
See application file for complete search history.

(56) References Cited

U.S. PATENT DOCUMENTS 10,108,658 B1 * 10/2018 Cole ................... G06F 16/2365
2002/0087500 A1 * 7/2002 Berkowitz ........ G06F 17/30348

* cited by examiner

*Primary Examiner* — Ajith Jacob
(74) *Attorney, Agent, or Firm* — Mintz Levin Cohn Ferris Glovsky and Popeo, P.C.

(57) ABSTRACT

A new unique value to be added to a column of a database table can be written to an in-memory array representing a dictionary of the column, and space can be allocated in at least one dictionary block on at least one page maintained on a persistent storage without writing the new unique value to the at least one dictionary block. A pending materialization bit for the at least one page can be set to identify the at least one page for deferred materialization.

15 Claims, 11 Drawing Sheets

UNIFIED TABLE DELTA DICTIONARY LAZY MATERIALIZATION

TECHNICAL FIELD

The subject matter described herein relates to lazy materialization of dictionaries in a database management system.

BACKGROUND

Data in a relational database management system (RDBMS) is generally loaded into main system memory for the performance of various database operations (e.g. inserting, selecting, updating, deleting, calling, etc. of records; copying, creating, joining, etc. of tables or other objects; executing queries, supporting operations of higher level database access applications; and the like). In an in-memory, high speed RMDBS, such as for example the HANA database system available from SAP SE of Walldorf, Germany, database files may be retained in persistent storage (e.g. on one or more hard disk or solid state drives or the like that provide a persistent version of the database between reboots, in case of power loss, or other factors that might cause data retained in volatile main system memory to be lost) and loaded into main system memory for performance of the database operations. Performing operations on data loaded into main system memory can provide significant performance gains relative to disk-based or even solid-state memory-based systems. Various compression approaches are generally used to reduce resource demands (e.g. memory, processor cycles, bandwidth, etc.).

SUMMARY

In one aspect, writing a new unique value to be added to a column of a database table to an in-memory array representing a dictionary of the column, allocating space in at least one dictionary block on at least one page maintained on a persistent storage without writing the new unique value to the at least one dictionary block, setting a pending materialization bit for the at least one page, the pending materialization bit identifying the at least one page for deferred materialization.

In some variations one or more of the following features can optionally be included in any feasible combination. The at least one page can be traversed when a materialization process is initiated for the page. The traversing can include copying the in-memory array to any block of the at least one page designated as requiring materialization by presence of the pending materialization bit. An offset from a dictionary array base pointer can be stored in a dictionary block header for each dictionary block on the at least one page, and a pointer to a block requiring materialization can be computed by adding the offset multiplied by a value size to the dictionary array base pointer. The at least one page can be materialized which can include copying complete ranges of values rather than writing values one-by-one.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an in-memory database management system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter includes a number of aspects that can be applied individually or in combinations of one or more such aspects to support a unified database table approach that integrates the performance advantages of in-memory RDBMS approaches with the reduced storage costs of on-disk database approaches. The current subject matter can be implemented in a RDBMS using in-memory OLAP, for example including databases sized at several terabytes (or more), tables with billions (or more) of rows, and the like; systems using in-memory OLTP (e.g. enterprise resource planning or ERP system or the like), for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Figure 1:
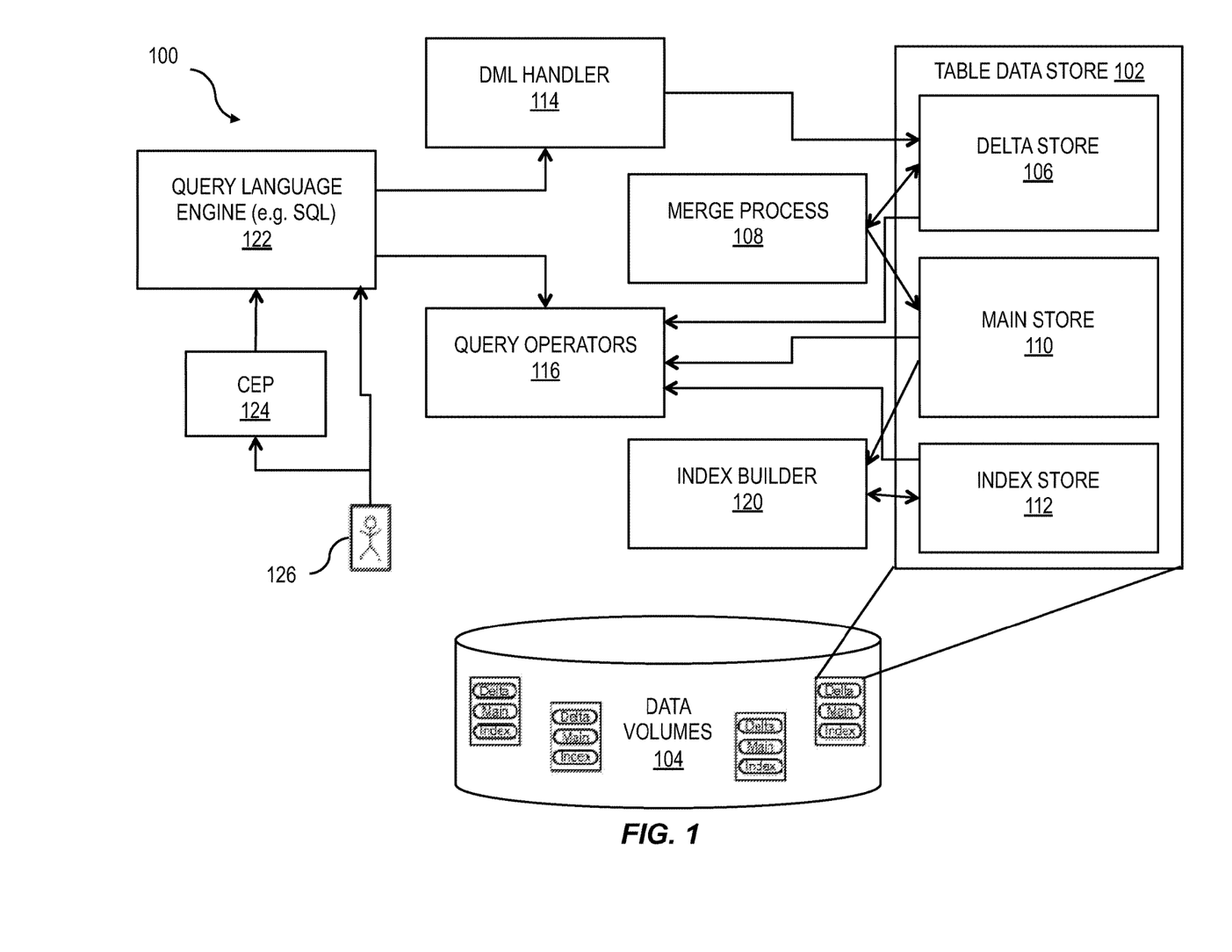
FIG. 1 shows a diagram illustrating features of a database management system architecture.

FIG. 1 shows a block diagram of an architecture 100 illustrating features that can be included in a database or database management system consistent with implementations of the current subject matter. A table data store 102, which can be retained among a plurality of data volumes 104, can include one or more of a delta store 106 (e.g. a paged delta part, which can optionally be optimized for online transaction processing (OLTP) and can optionally include a merge process 108), an index store 112 (e.g. one or more segmented indices), and a main store 110. The main store 110 can optionally include a main part that is fragmented consistent with features described herein.

Figure 2:
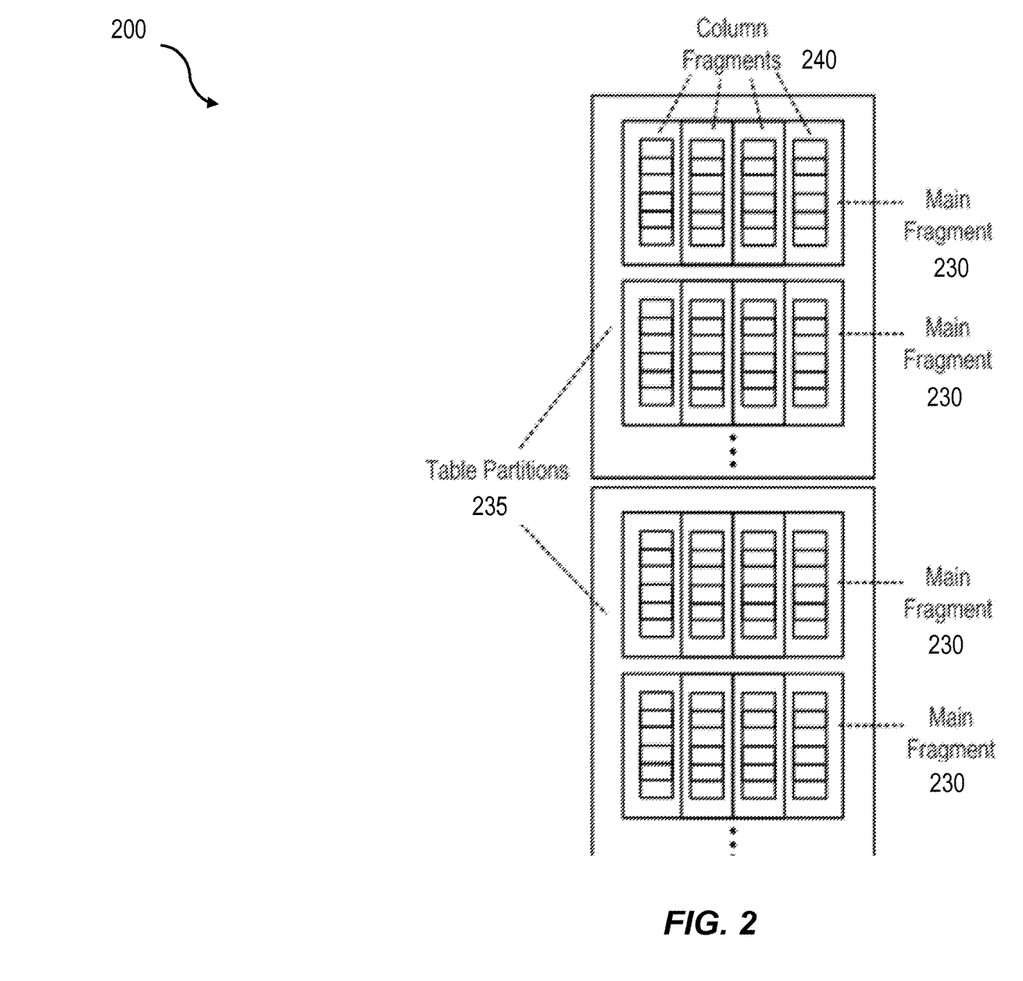
FIG. 2 shows a schematic representation of fragments stored in a main store.

To achieve a best possible compression and also to support very large data tables, a main part of the table can be divided into one or more fragments. FIG. 2 shows a schematic representation 200 of the various fragments stored in main store 110. One or more main fragments or fragments 230 can be used for each table or column of a database. Small, manageable tables can be represented with a single fragment. Very large tables can be split into two or more table partitions 235. Each table partition may, in turn, include two or more fragments 230. Fragments 230 can be horizontal slices of the table to which they belong. Each fragment 230 can include one or more column fragments 240. Each column fragment 240 can have its own dictionary and value ID array consistent with the features described herein.

Fragments 230 can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Database pages are typically used in a RDBMS as an internal structure for organizing data in persistent storage.

A page generally refers to a basic unit of storage in a database, and can be a fixed-length, contiguous block of data described by a single entry in a page table. A page is typically the smallest unit of data for memory management. The data capacity of a page can be sub-allocated as blocks. A page size is generally established when the database is built and typically cannot be changed. A representative page size can be on the order of 2 kB, 4 kB, 8 kB, 16 kB, or the like. Different types of pages can store different types of database objects. For example, data pages can store data rows or columns for a table, dictionary data (e.g. in an example in which dictionary encoding is used), etc. Index pages can store index rows for one or more levels of an index. Large object (LOB) pages can store data for text and image columns, for Java off-row columns, and the like.

Referring again to FIG. 1, other parts of the architecture 100 can include a data manipulation language (DML) handling module or similar functionality 114, one or more query handling modules or similar functionality 116 (e.g. including multi-version concurrency control), an index builder 120 that supports the index store 112, a query language engine 122 (which can, for example, be a SQL engine), a complex events processing module 124 (e.g. an event handler, a stream processing module, etc.) for receiving inputs from a user 126, and the like.

Figure 3:
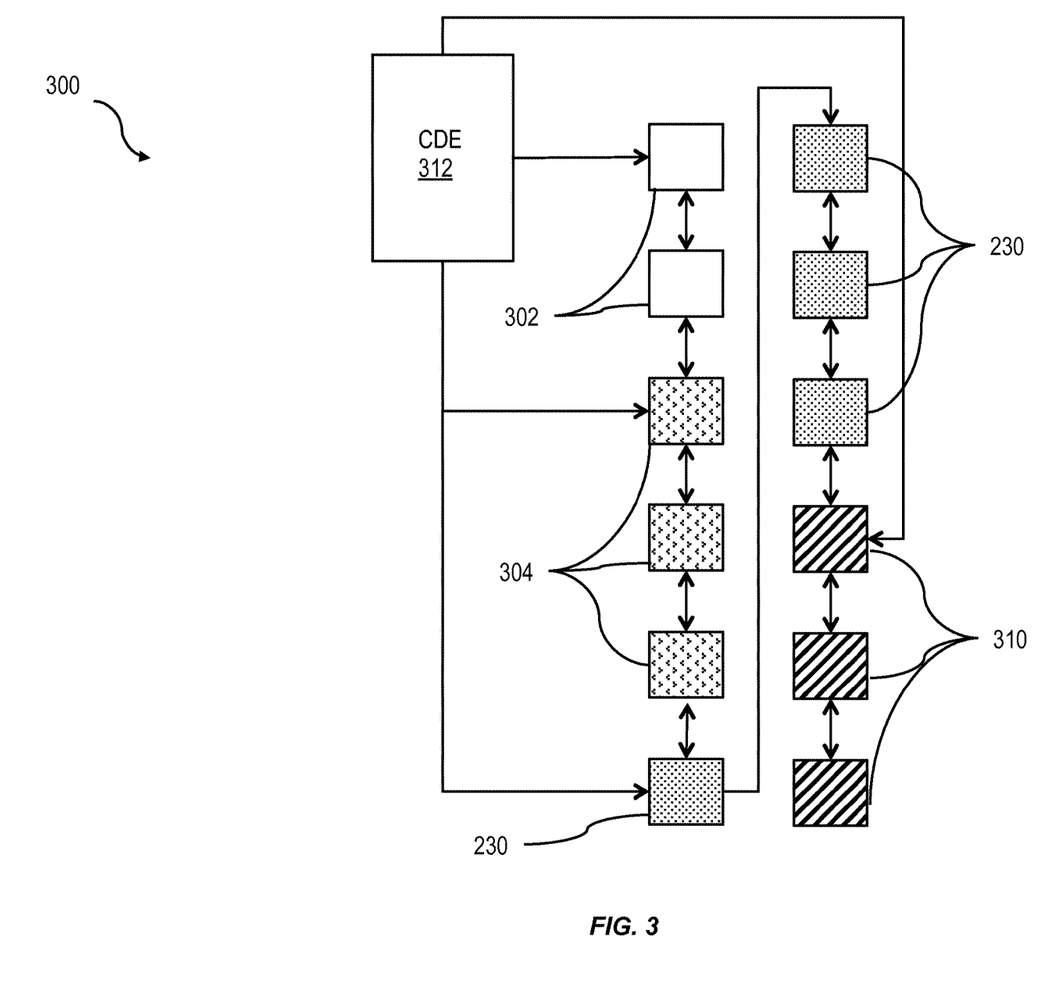
FIG. 3 shows a diagram illustrating features of a unified table container page chain.

FIG. 3 shows a block diagram illustrating an example of a unified table container page chain 300. As described above, each fragment can optionally include a chain of pages, which can include one or more pages. In general, a container can be represented as a page chain. A page chain can generally be characterized as a set of pages that are linked in a given order. While FIG. 3 illustrates a single page chain 300, multiple page chains can be used. In some implementations, the multiple page chains can be arranged in accordance with a hierarchy.

Also as shown in FIG. 3, sub-chains of the page chain can be defined for a delta part, a main part, dictionaries, index segments, and the like such that a "whole" of each of these entities contains one or more pages. In some implementations of the current subject matter, a delta part can include both "hot" delta fragments 302 and "cold" delta fragments 304, which can be stored separately. The main part can also be subdivided into main fragments 230. Pages containing dictionary-compressed columnar data 310 (discussed in more detail below) can refer to pages containing dictionaries for them. Individual table parts can be loaded into main memory on-demand. A merge process can be decoupled from transaction handling such that a merge process can be executed at recovery time (e.g. during log replay). A page chain, such as the example shown in FIG. 3, can be initiated by a container directory entry (CDE) 312.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID. Distinct from a logical RowID, the UDIV or DocID (or a comparable parameter) can indicate a physical position of a row (e.g. a data record), whereas the RowID indicates a logical position. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

Column data can be compressed. Table fragments can be materialized in-memory in contiguous address spaces for maximum performance. All fragments of the database can be stored on-disk, and access to these fragments can be made based on an analysis of the data access requirement of a query. One example of a compression approach usable with a modern RDBMS is dictionary encoding, in which a column has an associated dictionary. The dictionary is a table or other data structure that maps each unique value in its associated column to a unique ValueID, which is generally an integer value. The actual data in the column can be represented by a index vector, which includes an entry corresponding to each row of the actual column. Each entry in the index vector is the ValueID corresponding to the actual value in the column.

Figure 4:
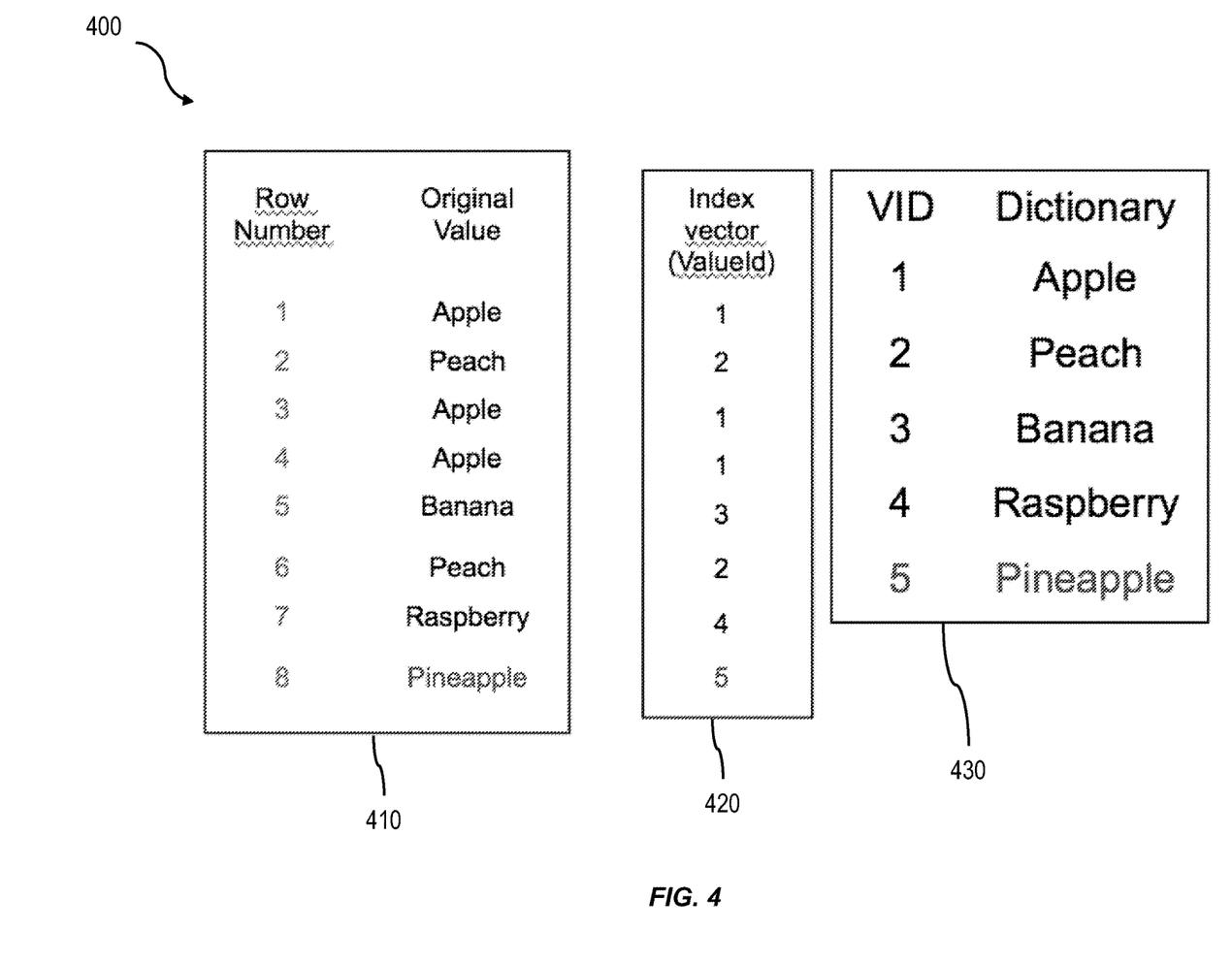
FIG. 4 shows a diagram illustrating data structures consistent with implementations of the current subject matter.

FIG. 4 shows a diagram 400 illustrating a simplified example of dictionary encoding including a column 410 and an index vector 420 and a dictionary 430 corresponding to the column. As shown, the column 410 includes actual values and row numbers. In this example, the unique values in the column include "Apple," "Peach," "Banana," "Raspberry," and "Pineapple." Insertion of the value "Pineapple" to the column 410 results in the addition of a new entry with ValueID 5 in the dictionary 430. The index vector 420 includes the ValueID corresponding to the real value for each row number in the column 410. To load the column form the persistent storage into memory, the index vector 420 and the dictionary for that column are read in. All actual values in the column can be represented in main system memory with only the index vector 420 and the dictionary 430.

Figure 5:
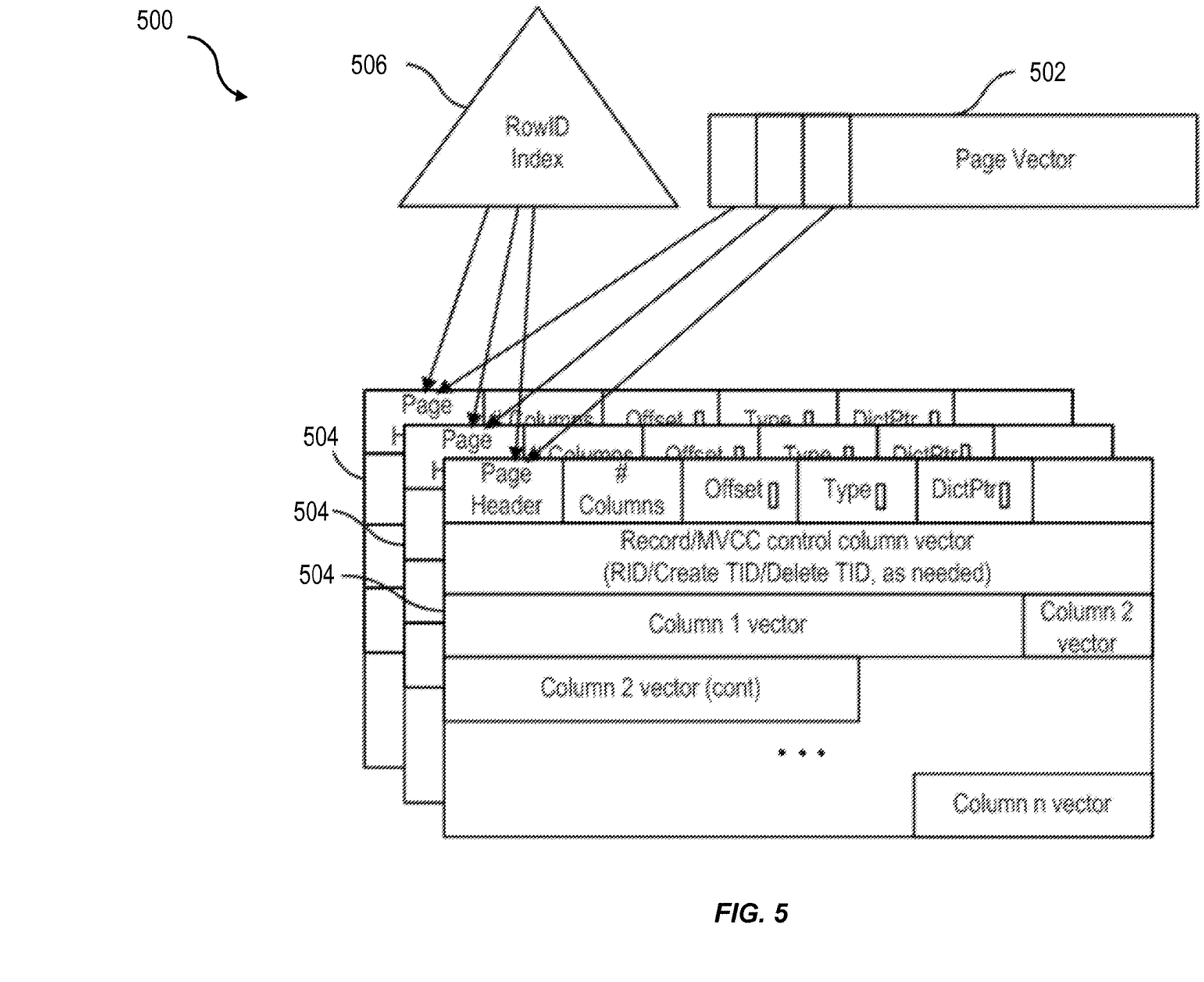
FIG. 5 shows a diagram illustrating features of a unified table delta.

FIG. 5 shows a block diagram of a unified table delta 500 consistent with one or more implementations of the current subject matter. A page vector 502 can hold page handles to individual pages 504 and can allow a fast iteration over the pages 504 (for example as part of a column or table scan). A page handle to an individual page 504 can include a pin or the like held in memory. As used herein, the term "pin" refers to holding a particular data page (which may also have been stored on disk) in memory. As an example, if a page is not pinned, it can be cleared from memory. Pinning is typically done on data pages being actively accessed so as to avoid potential performance degradations associated with reading the page from disk into memory.

A RowID index 506 can serve as a search structure to allow a page 504 to be found based on a given interval of RowID values. The search time can be on the order of log n, where n is very small. The RowID index can provide fast access to data via RowID values. For optimization, "new" pages can have a 1:1 association between RowID and row index, so that simple math (no lookup) operations are possible. Only pages that are reorganized by a merge process need a RowID index in at least some implementations of the current subject matter.

Figure 6:
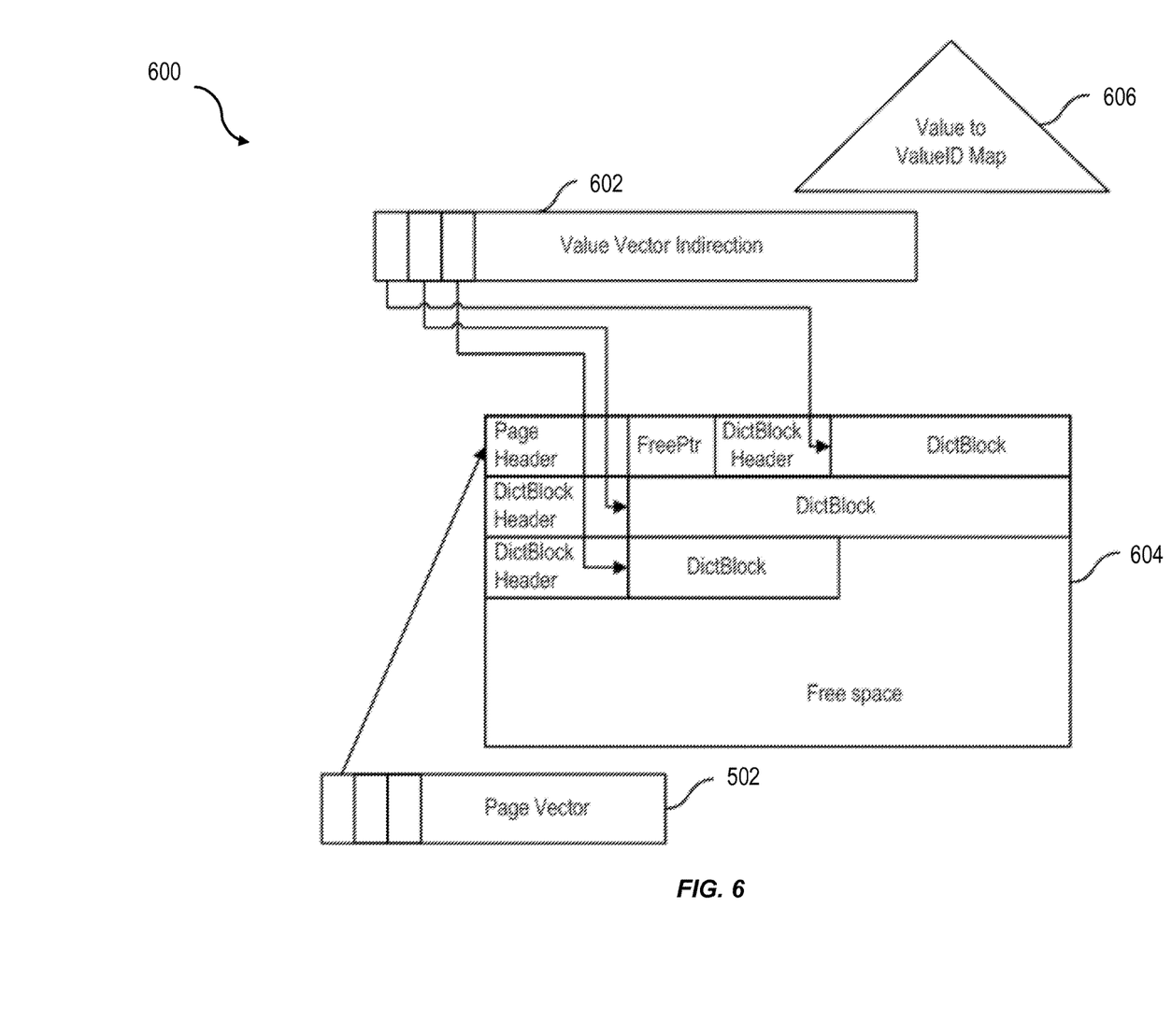
FIG. 6 shows a diagram illustrating features of a unified table unsorted dictionary.

FIG. 6 shows a block diagram of a unified table unsorted dictionary 600. Consistent with one or more implementations of the current subject matter, column data in a delta part can use unsorted dictionaries. A transient structure can be provided per delta column dictionary. The page vector 502 can handle pinning of pages in memory. Direct access can be provided via a pointer from other structures. A value vector indirection 602 can allow a same number of values per dictionary block 604. This capability can support an order of 1 performance cost for lookup of a value by ValueID. A dictionary can assign a unique ValueID (typically a numeric value) to each unique value such that the unique values (which are typically larger in memory size than the ValueID) can be stored once rather than multiple times. A value array is a structure used by the dictionary to retrieve values given a ValueID or vice versa. This technique, which can reduce the amount of memory needed to store a set of values where the values are not unique, is typically referred to as dictionary compression. A Value to ValueID map 606 can support hash or B-tree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A B-tree can be better for range scans but can be more expensive to maintain.

Figure 7:
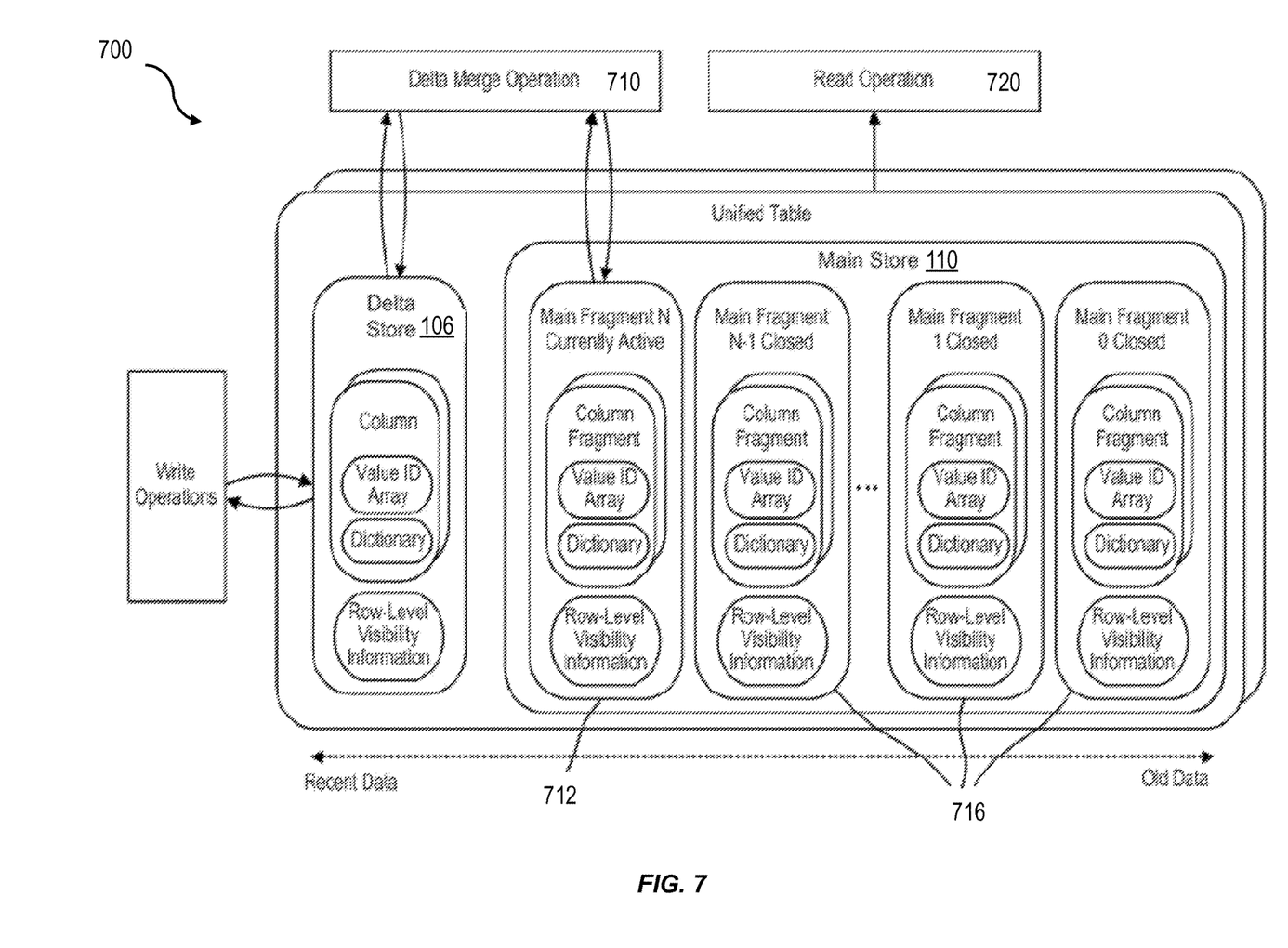
FIG. 7 shows a functional block diagram illustrating a delta merge operation and a read operation using a unified table.

FIG. 7 shows a functional block diagram 700 for performing a delta merge operation 710 on a unified table. New transactions or changes can initially be written into delta store 106. Main store 110 can include one active fragment 712 and one or more closed fragments 716. When updates are merged from delta store 106 into the main store 110, existing records in the closed fragments 16 cannot be changed. Instead, new versions of the records can be added to the active fragment 712, and old versions can be marked as invalid.

Functional block diagram 700 also illustrates a read operation 720. Generally, read operations can have access to all fragments (i.e., active fragment 712 and closed fragments 716). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

Figure 8:
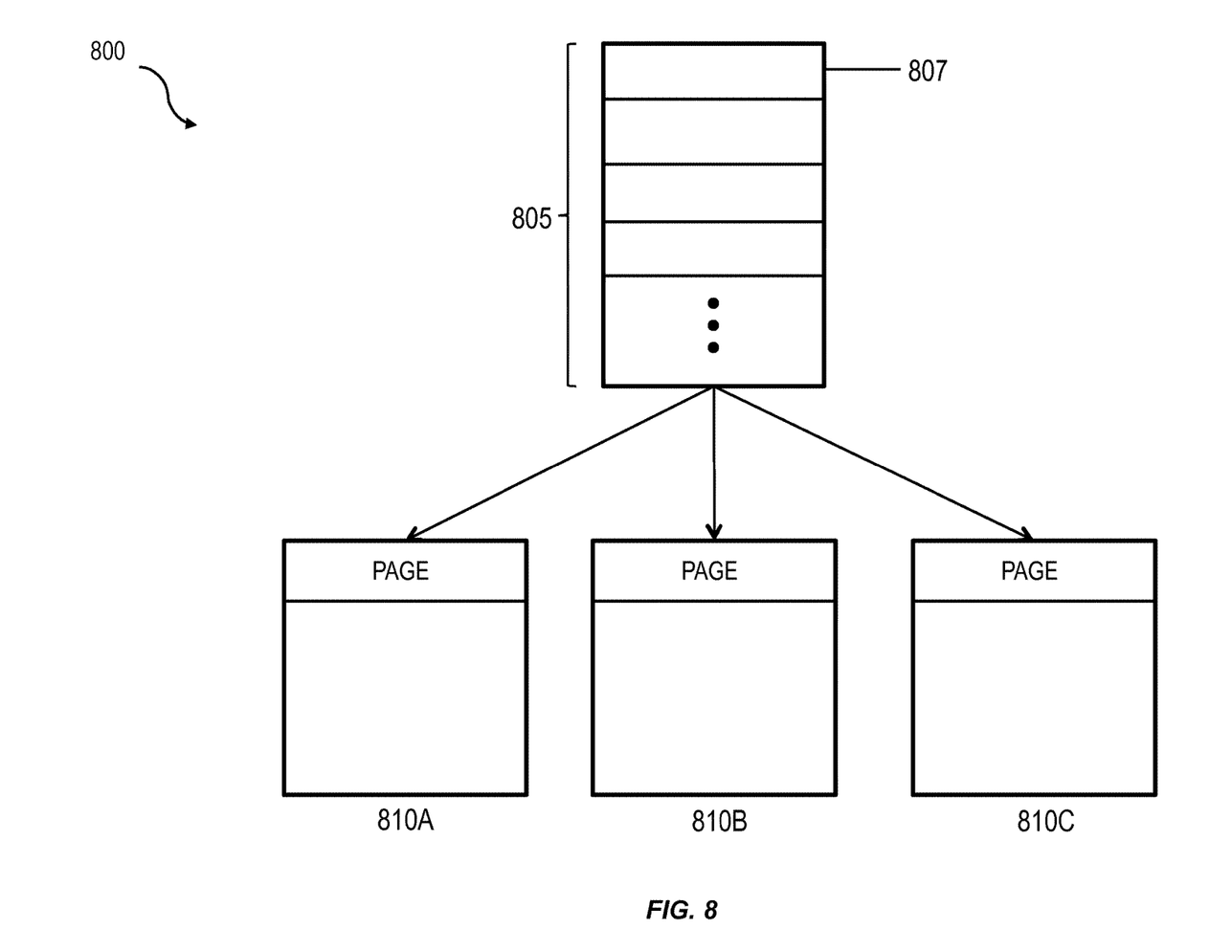
FIG. 8 shows a functional block diagram of a system architecture having a memory array and an on-disk page structure.

FIG. 8 shows a functional block diagram of a system architecture 800 consistent with implementations of the current subject matter. The illustrated system architecture 800 can provide benefits of a conventional disk/page-based system with the fast memory access available from an in-memory database system, such as the SAP HANA database system. System 800 can include an in-memory array, shown in FIG. 8 as a memory array 805, that can store data associated with a dictionary of a column of a table. In some implementations, the memory array 805 can include contiguous blocks of memory addresses. While the memory array 805 is illustrated as having a single column in the implementation of FIG. 8, any number of columns can be included. Each memory address can include a value. This value can be a ValueID that is representative of a unique data value in an actual column as stored in a dictionary 430. The memory array 805 can also include a starting memory address associated with the first element 807 in the memory array that can be stored as metadata. Once the starting memory address is known, transaction threads can quickly scan, search, or read the memory array 805 as each element in the memory array is sequentially stored at adjacent memory addresses.

Reading and writing individual pages (or blocks of rows on a given page), however, can be problematic when some of the data is not in the memory array 805. In an in-memory database system, the in-memory array can be written to persistent storage (e.g. disk drives, solid state drives, optical drives, etc.) in a serial manner using a series of pages. Because these data are serially written to the persistent storage by breaking the data up across one or more pages, there may be no correlation between the data and the page that it is on. As such, random access to a particular data value or ValueID may not be supported. If, for example, only a specific ValueID is needed during a read or write operation, the entire sequence of pages may be loaded into the in-memory array, which can be time consuming.

One approach for addressing this issue is to mirror the memory array 805 into a separate page based layout, such as pages 810A, 810B, and 810C, when persisting the memory array to disk. Using pages 810A, 810B, and 810C allows the system architecture 800 to take advantage of the disk optimized features associated with a disk/page based system. The pages 810A, 810B, and 810C can support a lookup mechanism that can track the location of pages in memory. This lookup mechanism can be helpful because the pages 810A, 810B, and 810C may not be sequentially stored in memory. In some implementations, this lookup mechanism can use a hash table that correlates page numbers and the contents of each page to memory addresses. Because individual pages can be easily located via this lookup mechanism, the system architecture 800 can load individual pages or blocks of rows on individual pages into the memory array 805. This capability can be useful during a system restore process. If, for example, dictionary data need to be restored to the memory array 805 after one or more computing systems of the system architecture 800 shuts down, the data can be copied and loaded from at least one of pages 810A, 810B, and 810C. Unlike an in-memory database system, which may require all of the data on pages 810A, 810B, and 810C to be loaded to the memory array 805, this approach can readily support random access of data. As such, only a desired subset of data needs to be loaded into the memory array 805. Mirroring the memory array 805 into the pages 810A, 810B, and 810C causes pagination of the memory array 805 in a manner that can support random access of individual pages and individual rows on pages without requiring the system architecture 800 to serialize all of the data when loading the data back to the memory array 805.

When the dictionary data in the memory array 805 are copied to pages 810A, 810B, and 810C, the data can be copied directly using its native N-bit encoded values. By keeping these data values in their native N-bit form at both the memory array 805 and the pages 810A, 810B, and 810C, no additional processing or translation is required to convert these data values between different formats (e.g., expanding and compressing the data values to/from a 32-bit integer format). This configuration can allow the system architecture 800 to reduce or minimize the amount of time associated with the copying process.

A dedicated thread can copy the data values from the memory array 805 to one or more of the pages 810A, 810B, and 810C. Specifically, such a thread can flush the data values from the memory array 805 to one or more of the pages 810A, 810B, and 810C using different materialization techniques. Data materialization refers to the process by which data values are copied from a memory layout (such as the memory array 805) to a page layout (such as the pages 810A, 810B, and 810C) within a persistent storage. When a transaction thread attempts to insert a data value into a table, the transaction thread can write this data value directly into the memory array 805. In order to later copy this data value to one of the pages 810A, 810B, and 810C, the transaction thread may need to reserve one or more rows on these pages to store this data value. Reserving a row on a page allows data values to be copied to the row at a later time and indicates that the row positions on the page are in use. Upon reserving a row on a page, the transaction thread may mark the page as pending materialization. Each page can have a corresponding control structure that is stored in system memory. This control structure can store information representative of the runtime transient status of the page. This status can include whether the page is ready for materialization and can be represented using a pending materialization bit. The value of the pending materialization bit can indicate whether the page needs to be materialized. Upon determining that a page is pending materialization, the flusher thread can materialize the data and clear the pending materialization bit. By delegating data materialization responsibilities to a dedicated flusher thread, the transaction thread does not have to write data values to both the memory array 805 and to one of the pages 810A, 810B, and 810C. This configuration allows the transaction thread to perform its transaction quickly which, in turn, can lead to good system transaction throughput.

In some implementations, multiple threads may write to the memory array 805 in parallel. In doing so, these threads may reserve rows on the same page and may attempt to mark the same page for materialization by changing the value of the pending materialization bit. Marking a page for materialization ensures that the thread's data values will be copied from the memory array 805 to one of the pages 810A, 810B, and 810C. Because the pending materialization bit applies to an entire page, the value of this bit may only be set once. For example, first and second transaction threads T1 and T2 may concurrently add data values to the memory array 805. In doing so, the transaction threads T1 and T2 can reserve rows on a page for materialization, such as the page 810A. If the first transaction thread T1 marks the page 810A for materialization by changing the value of the pending materialization bit, then it may be unnecessary for the second transaction thread T2 to do the same because the entire page is marked for materialization. This configuration provides a lock free mechanism whereby multiple transaction threads can reserve rows on the same page without conflict.

Different protocols can be used to materialize data from the memory array 805 to the pages 810A, 810B, and 810C. These protocols can include an eager materialization protocol, a savepoint materialization protocol, a lazy materialization protocol, and a batch materialization protocol.

In an eager materialization protocol, a transaction thread, such as a DML thread, can write data to both the memory array 805 and to one or more of pages 810A, 810B, and 810C. When a transaction thread inserts a column into a data table, the transaction thread can write the ValueIDs associated with the new column to the memory array 805. In addition, the transaction thread can write these ValueIDs to one or more of the pages 810A, 810B, and 810C. In some implementations, the eager materialization protocol can use the optimized bit copy process described above to copy these data values. This protocol may not be optimal because the transaction thread performs two write operations (i.e., to the memory array and to the pages) which can increases its execution time and the transaction response time. Also, because multiple transaction threads may write to the same page, contention on the page can increase. This contention can take the form of a mutex (lock) contention, a lock free algorithm execution time, or cache line misses as multiple clients modify data on the same cache lines.

The eager materialization protocol can be optimized in light of the fact that read operations utilize the memory array 805 and not pages 810A, 810B, and 810C. Pages 810A, 810B, and 810C are primarily used for persistence purposes to restore a system after shutdown, for example. Because read operations utilize the memory array 805, there may not be a need to immediately populate the pages 810A, 810B, and 810C, as described above with respect to the eager materialization protocol. In some implementations, data materialization can be deferred up until a system savepoint is encountered using a savepoint materialization protocol.

The system architecture 800 can maintain a transaction log that records all transactions occurring within the system. These transactions can be persisted to the persistent storage. If one or more computing systems of the system architecture 800 crashes, the system status can be restored by replaying the transactions in the transaction log. The system architecture 800 can enforce various savepoints in order to trigger the persisting of these transactions to disk. In some implementations, the occurrence of a savepoint can trigger a savepoint flusher thread to begin the materialization process. For example, when a savepoint is encountered, the savepoint flusher thread can begin materializing data to one or more of the pages 810A, 810B, and 810C in order to avoid losing data. With this protocol, the savepoint flusher thread can be responsible for writing large amounts of data to the data pages. In order to reduce the amount of work done by the savepoint flusher thread, a resource flusher thread can be used in tandem with the savepoint flusher thread. The resource flusher thread can be configured to run at predetermined intervals to materialize modified pages. If a page has not been changed since the last write, then the savepoint flusher thread can safely ignore the page as it may have already been materialized by the resource flusher thread.

The savepoint materialization protocol provides several advantages. First, because the savepoint flusher thread handles data materialization, transaction threads do not need to spend time writing data to the page. This division of duties can reduce or eliminate the response time penalties described above with respect to the eager materialization protocol. Also, because only the savepoint flusher thread materializes data to one or more of pages 810A, 810B, and 810C, contention on the page can be eliminated. In some implementations, the savepoint materialization protocol can use the bit copy mechanism described above to materialize data from the memory array 805 to one or more of the pages 810A, 810B, and 810C. Using the bit copy mechanism allows this protocol to copy many rows of data in an efficient manner which, in turn, can yield significant time savings. Generally, it takes less time to copy 1000 contiguous rows as a single operation than it is to perform 1000 copies of a single row.

In a lazy materialization protocol, the flusher thread can copy data values from the memory array 805 to one or more of the pages 810A, 810B, and 810C when a predetermined condition has been met. For example, the flusher thread can flush the data values from the memory array 805 to one or more of the pages 810A, 810B, and 810C when a predetermined number or percentage of rows on a page have been reserved. This condition can indicate, for example, that copying should begin when half of the rows on a page have been reserved. Unlike the eager materialization protocol, which flushes data from memory array 805 to one of the pages 810A, 810B, and 810C as soon as a data value is written to a row in the memory array, the lazy materialization protocol can wait until the predetermined condition is satisfied. In some implementations, the lazy materialization protocol can use the optimized bit copy process described above to copy these data values.

In a batch materialization protocol, the flusher thread can copy data values from the memory array 805 to one of the pages 810A, 810B, and 810C when all of the rows on a page have been reserved. As described above, a transaction thread may insert data values or ValueIDs into the memory array 805 one row at a time. Rather than copy these data values one row at a time from the memory array onto a data page as described above with respect to the eager materialization protocol, the batch materialization protocol can copy as many rows as will fit onto a single page at a time. In some implementations, the batch materialization protocol can use the optimized bit copy process described above to copy these data values.

In some implementations, an unload bitmap can be used to optimize the materialization protocols described above. An unload bitmap can track which rows are open on a page. As previously described, when a transaction thread creates a new table and adds a row to the table, the transaction thread can add a row to the memory array 805. Upon doing so, the transaction thread can also allocate a page (e.g. the page 810A, which can have one or more rows onto which data from the memory array 805 can be later materialized. When a page is first allocated, all of the rows on the page can be initially open (i.e., pending insertion or reservation by a transaction thread). As transaction threads add additional rows to the memory array 805, they can reserve additional rows on the page 810A for later materialization. The rows on the page 810A can be closed as they are reserved by transaction threads. When all of the rows on the page 810A are closed, the page can be fully materialized which, in turn, can trigger a flusher thread to copy the data from memory array 805 to the page 810A.

Figure 9:
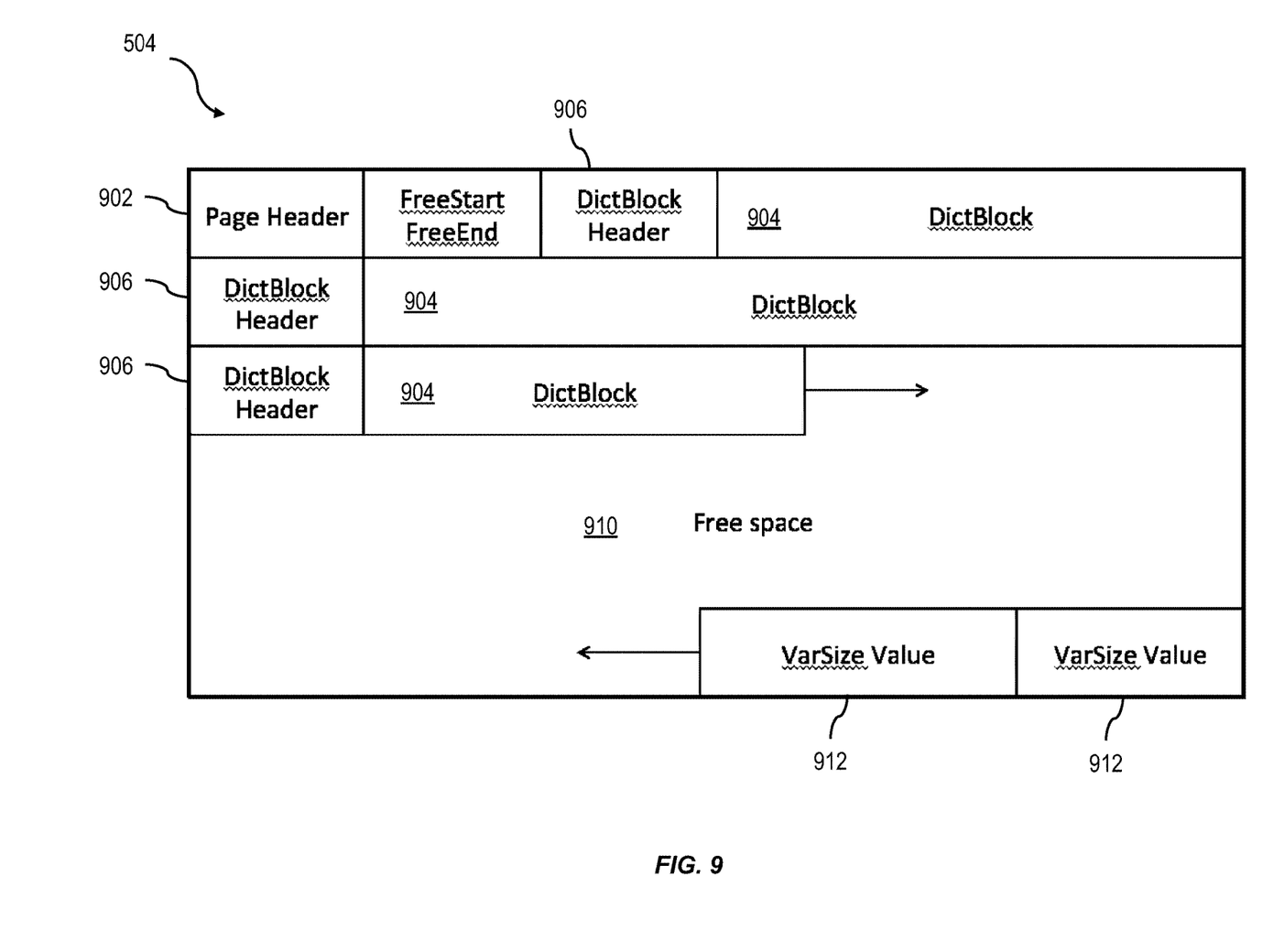
FIG. 9 shows a diagram of a page illustrating allocation of blocks consistent with implementations of the current subject matter.

Each dictionary block in a page or page chain used for dictionary storage contains a column ID, a starting value ID, and a type in its block header information. With this information, it is easy to load all dictionaries at once by scanning a page or page chain a single time and assigning individual blocks to the respective dictionaries that are stored in the page or page chain. FIG. 9 shows a diagram illustrating features that can be included in a page 504. As shown, the page 504 includes a page header 902 and a series of dictionary blocks 904, each beginning with a dictionary block header 906 as well as currently unallocated free space 910. One or more variable sized values 912 can optionally be stored from the end of the page 504 forward.

As noted above, dictionary pages can be used to represent one or more dictionary blocks in the persistent storage of a high speed in-memory database. As discussed in reference to FIG. 8, when a dictionary is read from a data store (e.g. a persistent storage as discussed elsewhere herein) into system main memory for execution of database operations, the dictionary blocks are generally transformed to an in-memory vector representation of the dictionary (referred to for the remainder of the description as an in-memory array 805. Similarly, the in-memory array 805 retained in system main memory can be written to the data store to persist changes and to provide a persistent backup of any changes made in the in-memory vector representation.

Database manipulation language (DML) operations on a dictionary generally require ensuring that that data are persisted to a persistent storage (also referred to as a secondary storage). Using currently available approaches, each operation on the dictionary that creates a new value requires storage of this new value both in the in-memory vector representation of the dictionary and to the dictionary retained on the persistent storage (e.g. in one or more blocks of one or more pages). Using previously available approaches, when a value is added to a dictionary, the value is typically added both to the in-memory vector representation of the dictionary in the system main memory and to the persisted version of the dictionary in one or more dictionary blocks in a page chain on the persistent storage. This approach can lead to consumption of a significant amount of system resources for a dictionary update during run time.

Consistent with implementations of the current subject matter, writing of dictionary changes to one or more dictionary blocks in a page chain retained in persistent storage can be delayed and instead performed "lazily," for example when the page chain is written (otherwise referred to as "flushed") to the persistent storage. In other words, values can be copied from the in-memory vector representation of the dictionary to one or more dictionary blocks in the persistent storage during a flush operation rather than immediately upon creation or insertion. In this manner, data can be written to the persistent storage without requiring actual storage of a second copy into the block. Instead of accessing two cache lines when writing the value, it is necessary to access only one to actually write the value into the dictionary. Flushing the block (e.g. materialization to one or more pages) can then copy complete ranges of values (several values per cache line, additionally via sequential access), which is much more efficient than writing values one-by-one. Furthermore, this process can be removed from a critical path using implementations of the current subject matter.

A lazy materialization approach similar to that described above in reference to FIG. 8 can be applied to dictionary data such that dictionaries are flushed from an in-memory array 805 to one or more pages retained in the persistent storage, but only as part of a bulk process. To achieve this result, all pages allocated for a dictionary can be represented as a materialization callback, which can be called by a shadow paging subsystem at appropriate places to materialize page data (for example as described above). As used herein, a materialization callback refers to setting a marker to indicate that a materialization of data in the in-memory array are to be written to one or more blocks of one or more pages in a page chain once a materialization process (e.g. as described above) is initiated.

In operation, as a value is written to the in-memory array 805 for a dictionary, space is allocated in an existing dictionary block (or a new block is allocated if space is not available in an existing dictionary block), and any page that will require an update on materialization is marked as "dirty" (e.g. by setting a pending materialization bit as discussed above). This can occur via use of a data vector identifier that is associated with the in memory array 805. Until the actual materialization proceeds, no further operations need to be executed on a page in the persistent storage.

When page needs to be materialized, for example because a materialization process is initiated for another reason, the one or more pages to be materialized is/are traversed. Based on dictionary block headers present in one or more pages and the data vector identifier including the pointer to the block to be written, contents of these blocks requiring materialization are copied in bulk from the in-memory array(s) to the one or more pages. For each dictionary block, an offset from a dictionary array base pointer can be stored in the dictionary block header for that dictionary block. The pointer to a given block can be readily computed by adding this offset multiplied by a value size (e.g. a size of values in the block) to the base pointer.

Figure 10:
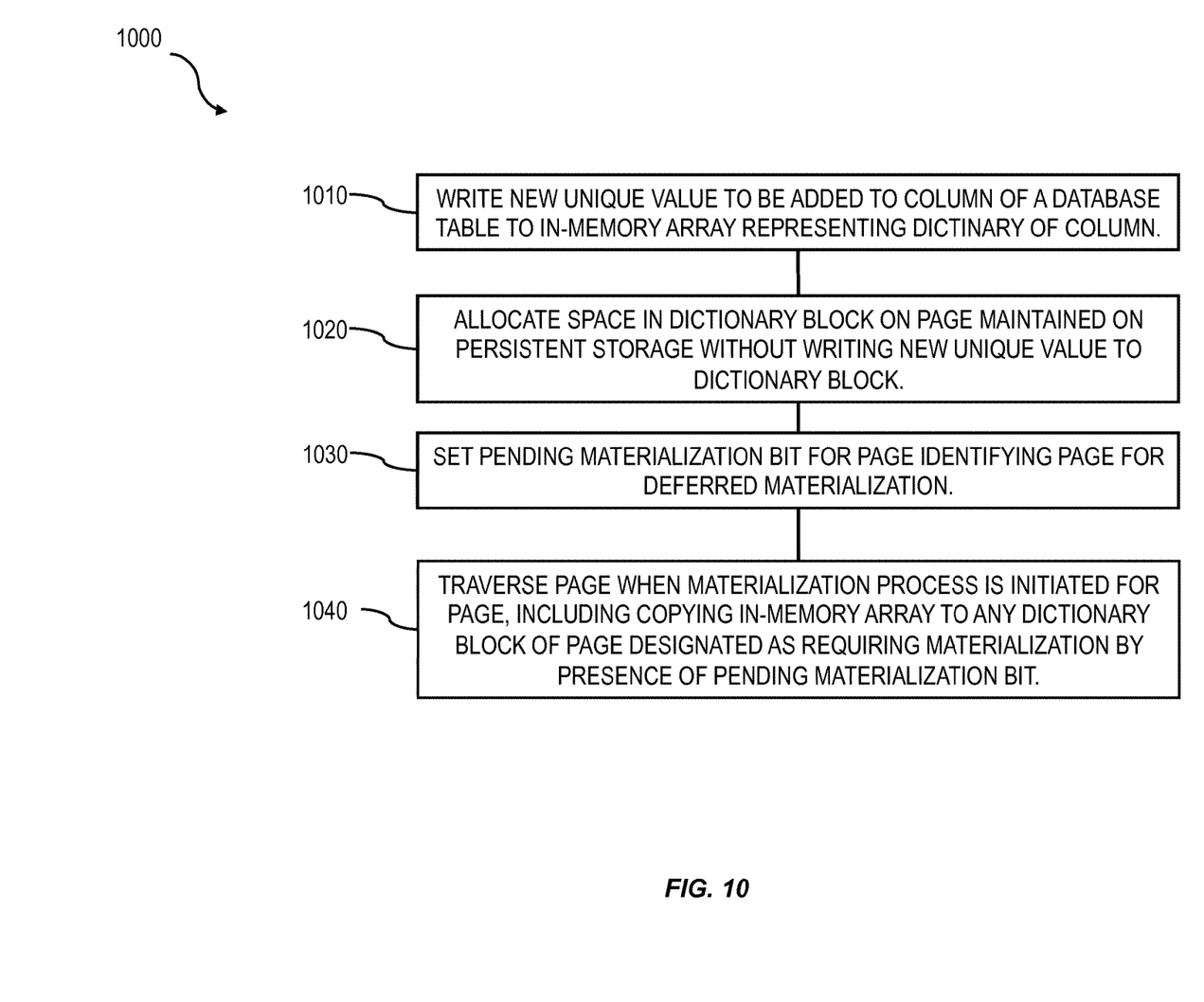
FIG. 10 shows a process flow diagram illustrating aspects of a method having one or more features consistent with implementations of the current subject matter.

FIG. 10 shows a process flow chart 1000 illustrating one or more features that can be included in a method consistent with implementations of the current subject matter. At 1010, a new unique value to be added to a column of a database table is written to an in-memory array representing a dictionary of the column. Space in at least one dictionary block on at least one page maintained on a persistent storage is allocated at 1020 without writing the new unique value to the at least one dictionary block. At 1030, a pending materialization bit is set for the at least one page to identify the at least one page for deferred or "lazy" materialization. A pointer to the at least one block written to the in-memory array need not be stored in the in-memory array as discussed above.

At 1040, the at least one page can be traversed when a materialization process is initiated for the page. The traversing can include copying a relevant part of the in-memory array to any dictionary block of the at least one page designated as requiring materialization by presence of the pending materialization bit.

Figure 11:
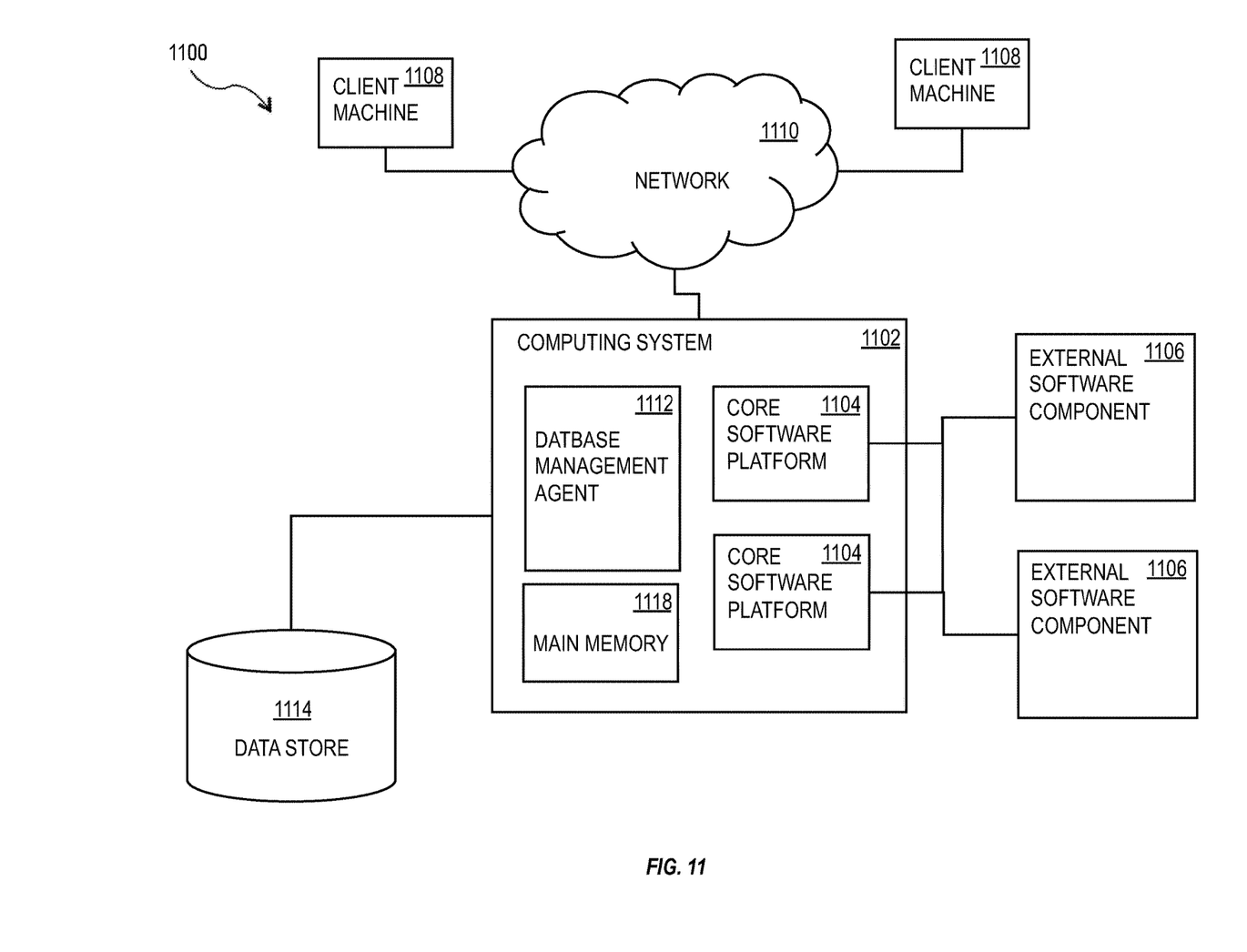
FIG. 11 shows a diagram illustrating features of a system that can implement one or more features consistent with implementations of the current subject matter.

FIG. 11 shows a diagram of a system 1100 that can implement one or more features of the current subject matter. FIG. 11 shows a diagram of a system 1100 that can implement one or more features of the current subject matter. A computing system 1102 can include one or more programmable processors executing operations of one or more core software platform modules 1104 that provide one or more features of a software applications that include and/or make use of database management features. The computing system 1102 can also aggregate or otherwise provide a gateway via which users can access functionality provided by one or more external software components 1106. One or more client machines 1108 can access the computing system 1102, either via a direct connection, a local terminal, or over a network 1110 (e.g. a local area network, a wide area network, a wireless network, the Internet, or the like).

A database management agent 1112 or other comparable functionality can access a data store 1114. The database management agent 1112 can implement one or more of the features of implementations discussed herein. The data store 1114 can include persistent storage (e.g. hard disks, solid state drives, optical storage, or the like) capable of maintaining data across system restarts, power loss, etc., and can store any kind of data, including but not limited to database tables, dictionaries, data objects (e.g. business objects), metadata, and the like.

The database management agent 1112 or other comparable functionality can be configured to load data, such as for example dictionary data or the like (e.g. in the form of a page 504 or chain of pages as discussed above), from the data store 1114 into the main memory 1118. Similarly, the database management agent 1112 can be configured to persist the contents of the main memory 1118 to the data store 1114 consistent with one or more approaches described herein or otherwise known.

Some implementations of the current subject matter can realize technical benefits, for example in avoiding and/or reducing cache misses when writing to the dictionary by almost a factor of two, since only in-memory arrays are modified. Since values are written in bulk during materialization, they incur less cache misses and furthermore, the time needed to materialize persistent data is not in critical path of a DML operation.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   writing a new unique value to be added to a column of a database table to an in-memory array representing a dictionary of the column;
   allocating space in at least one dictionary block on at least one page maintained on a persistent storage without writing the new unique value to the at least one dictionary block; and
   setting a pending materialization bit for the at least one page, the pending materialization bit identifying the at least one page for deferred materialization, the deferred materialization being executed at a savepoint occurring subsequent to the setting and upon determination that a predetermined number of rows on the at least one page has been reserved for materialization.

2. The computer program product as in claim 1, wherein the operations further comprise traversing the at least one page when a materialization process is initiated for the page.

3. The computer program product as in claim 2, wherein the traversing comprises copying the in-memory array to any block of the at least one page designated as requiring materialization by presence of the pending materialization bit.

4. The computer program product as in claim 1, wherein the operations further comprise:
   storing an offset from a dictionary array base pointer in a dictionary block header for each dictionary block on the at least one page; and
   computing a pointer to a block requiring materialization by adding the offset multiplied by a value size to the dictionary array base pointer.

5. The computer program product as in claim 1, wherein the operations further comprise materializing the at least one page, the materializing comprising copying complete ranges of values rather than writing values one-by-one.

6. A method for implementation by one or more data processors forming part of at least one computing system, the method comprising:
   writing a new unique value to be added to a column of a database table to an in-memory array representing a dictionary of the column;
   allocating space in at least one dictionary block on at least one page maintained on a persistent storage without writing the new unique value to the at least one dictionary block; and
   setting a pending materialization bit for the at least one page, the pending materialization bit identifying the at least one page for deferred materialization, the deferred materialization being executed at a savepoint occurring subsequent to the setting and upon determination that a predetermined number of rows on the at least one page has been reserved for materialization.

7. The method as in claim 6, further comprising traversing the at least one page when a materialization process is initiated for the page.

8. The method as in claim 7, wherein the traversing comprises copying the in-memory array to any block of the at least one page designated as requiring materialization by presence of the pending materialization bit.

9. The method as in claim 6, further comprising:
   storing an offset from a dictionary array base pointer in a dictionary block header for each dictionary block on the at least one page; and
   computing a pointer to a block requiring materialization by adding the offset multiplied by a value size to the dictionary array base pointer.

10. The method as in claim 6, further comprising materializing the at least one page, the materializing comprising copying complete ranges of values rather than writing values one-by-one.

11. A system, comprising:
    computer hardware comprising at least one programmable processor configured to perform operations comprising:
    writing a new unique value to be added to a column of a database table to an in-memory array representing a dictionary of the column;
    allocating space in at least one dictionary block on at least one page maintained on a persistent storage without writing the new unique value to the at least one dictionary block; and
    setting a pending materialization bit for the at least one page, the pending materialization bit identifying the at least one page for deferred materialization, the deferred materialization being executed at a savepoint occurring subsequent to the setting and upon determination that a predetermined number of rows on the at least one page has been reserved for materialization.

12. The system as in claim 11, wherein the operations further comprise traversing the at least one page when a materialization process is initiated for the page.

13. The system as in claim 12, wherein the traversing comprises copying the in-memory array to any block of the at least one page designated as requiring materialization by presence of the pending materialization bit.

14. The system as in claim 11, wherein the operations further comprise:
    storing an offset from a dictionary array base pointer in a dictionary block header for each dictionary block on the at least one page; and
    computing a pointer to a block requiring materialization by adding the offset multiplied by a value size to the dictionary array base pointer.

15. The system as in claim 11, wherein the operations further comprise materializing the at least one page, the materializing comprising copying complete ranges of values rather than writing values one-by-one.

* * * * *